March 27, 1962 K. SCHREYER ETAL 3,027,448
METHOD AND DEVICE FOR BUTT WELDING OF HEAVY WORKPIECES
Filed Aug. 17, 1959

# United States Patent Office 3,027,448
Patented Mar. 27, 1962

3,027,448
METHOD AND DEVICE FOR BUTT WELDING OF HEAVY WORKPIECES
Karl Schreyer, Munich, and Hellmuth Gaudich, Koln-Junkersdorf, Germany, assignors of one-half to Siemens - Schuckertwerke Aktiengesellschaft, Berlin-Siemensstadt, Germany, and one-half to Klockner-Humboldt-Deutz AG., Koln (Rhine), Germany, both corporations of Germany
Filed Aug. 17, 1959, Ser. No. 834,232
Claims priority, application Germany Aug. 16, 1958
6 Claims. (Cl. 219—101)

Our invention relates to a method and device for butt welding of heavy workpieces that are short in the forging direction on one or both sides of the butt weld.

Butt welding or electro-forging is performed in a welding machine in which the two parts to be joined by upset welding or flash welding must be correctly aligned and firmly clamped prior to performing the electric welding operation proper. The aligning of the two parts in the welding machine encounters considerable difficulties with heavy workpieces if one or both of the parts are short in the forging direction so that, due to the shortness of the workpiece and the space required for the current supply means, the distance between the clamping devices of the machine is too small to make the workpiece readily accessible.

It is an object of our invention to eliminate such difficulties.

According to our invention, the workpiece parts to be butt welded are inserted, outside of the welding machine, into intermediate clamping chucks adapted to the shape of the workpiece, and the two workpiece parts are accurately aligned and clamped in the chucks before the entire workpiece and chuck assembly is inserted into the machine where the assembly is lowered and set upon the bottom electrodes of the machine. Thereafter the upper electrodes of the welding machine are lowered and clamped against the chuck, and the welding is otherwise performed in the conventional manner, with the chucks acting as intermediate conductors or component electrodes for passing the welding current from the machine electrodes through the workpiece parts being welded.

According to another feature of our invention, a device for performing the novel welding method comprises a mobile carrier or truck which has a front portion that can be run into and out of the welding machine and carries the two above-mentioned intermediate chucks, each chuck comprising an upper portion and a lower portion, and the two chucks being adjustable relative to each other on the mobile carrier for the purpose of aligning and clamping the parts of the workpiece prior to moving them on the carrier into the interelectrode space of the welding machine.

The invention will be further described with reference to the drawing in which.

Figure 1:
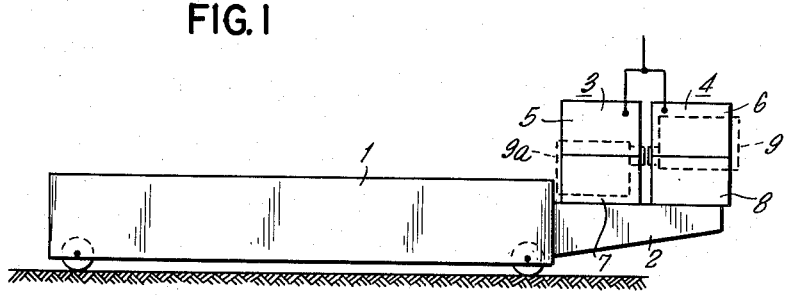
FIG. 1 illustrates a lateral view of a supporting truck with two intermediate clamping chucks in which the two parts to be butt welded are accommodated and aligned.
Figure 2:
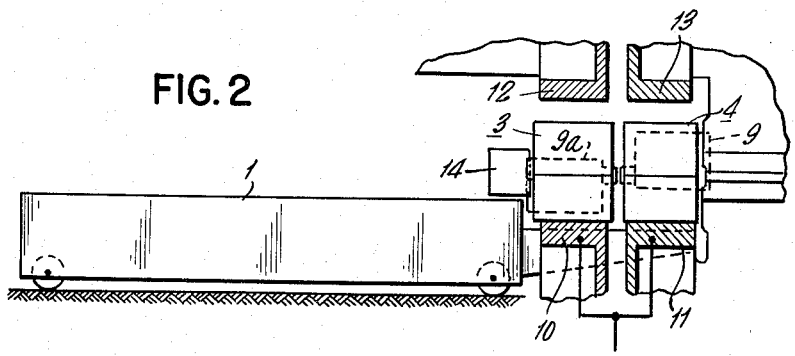
FIG. 2 shows the same truck in a subsequent stage of the method, at which the chucks with the workpiece parts are run into the welding machine and are lowered onto the bottom electrodes, the machine electrodes being shown in cross section.
Figure 3:
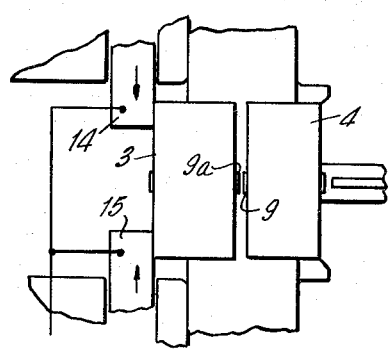
FIG. 3 shows a top view, the upper electrodes of the machine being removed to show the intermediate chucks in position ready for the welding operation proper.

As shown in FIG. 1, the device comprises a transporting carrier or truck 1 which has a fork-lift structure with two supporting arms 2 that can be lowered and lifted in the manner known from fork-lift trucks. Placed upon the arm 2 are two intermediate clamping chucks 3 and 4 composed of respective upper portions 5, 6 and respective lower portions 7, 8. The upper and lower portions of each chuck have their clamping cross sections adapted to the shape of the workpiece portions 9 and 9a to be welded together. The two chucks 3 and 4 are displaceable on arm structures 2 relative to each other for the purpose of properly aligning the workpiece portions clamped between the respective portions of the chucks. The portions 5, 7 and 6, 8 consist of the same electrically good conducting material as the electrodes 10, 11, 12, 13 (FIG. 2) of the welding machine.

The two parts 9, 9a of the workpiece to be welded together are placed into the respective chucks 3, 4 and are then properly aligned by adjusting or displacing the portions of each chuck. Thereafter the parts 9, 9a are clamped fast in the proper position. The portions of each chuck may be fastened and clamped against each other by pressure bolts (not shown) or any other suitable clamping means. The position of the two chuck structures relative to each other can be adjusted simply by shifting one or both of the fork-lift arms 2 where they remain put under their own weight, although fastening means may also be used if desired.

After aligning and clamping the workpiece parts, the fork-lift portion of the truck is run into the welding machine, where the entire chuck and workpiece assembly is lowered onto the bottom electrodes 10 and 11. The bottom electrode 10 and the top electrode 12 form part of a stationary clamping block which permits clamping the chuck 3 by lowering the electrode 12. The electrode 11 and the upper electrode 13 form part of another clamping block assembly which, after lowering the electrode 13 into clamping position onto the chuck 4, is movable toward the electrodes 10, 12, while upsetting pressure is being applied to the workpiece during welding.

After setting the intermediate chucks 3 and 4 down onto the bottom electrodes 10, 11, lateral stops 14 and 15 are moved behind the chuck 3 to form an abutment for the chucks in the upsetting or forging direction. Then the clamping block assemblies of which the electrodes 10, 12 and 11, 13 form part are put in operation as described above, and the welding operation is performed by passing electric current through the electrodes and through the intermediate chucks which now perform the function of intermediate electrodes.

After the welding operation is completed, the intermediate chucks are released in the reverse sequence of the method described above, the lateral stops 14, 15 are withdrawn, the intermediate chucks are lifted by means of the arms 2, and the assembly of the chucks with the welded workpiece is run out of the welding machine. Thereafter the chucks can be opened for removing the welded workpiece.

With a correspondingly modified design of the welding machine, the intermediate chucks may also be run into the electrode space of the welding machine in a direction perpendicular to the upsetting axis, or can be lowered from above into the welding machine. The chucks may also be run horizontally into the welding machine at a right angle to the direction of the upsetting axis and can then be lowered from above into the proper location between the machine electrodes.

By virtue of the invention, the aligning of the workpiece parts to be butt welded is considerably facilitated because it is performed outside of the welding location of the machine where the workpiece portions are not readily accessible and where, in some cases, the considerable amount of heat, stemming from the preceding welding operation, must be coped with. Furthermore, during welding, the next set of workpiece parts to be welded can be inserted into another group of intermediate chucks and can be aligned and clamped so that a virtually continuous welding process is afforded.

We claim:

1. The method of preparing for welding and butt welding of heavy workpieces having short length in the upsetting direction on one or both sides of the weld, which comprises placing the two parts of the workpieces outside of the welding machine into respective intermediate clamping chucks of a shape adapted to that of the parts, aligning and clamping the parts in the chucks in the mutual positions required for welding, moving the chuck and workpiece assembly as a whole into the welding machine and removably contacting the chucks of the assembly with the electrodes of the machine, and thereafter performing the welding operation with the intermediate chucks remaining between workpiece and electrodes.

2. In combination with a butt welding machine having two pairs of top and bottom electrodes, a device for preparing to butt-weld heavy workpieces having short length in the upsetting direction on one or both sides of the weld, comprising a mobile carrier having a vertically displaceable carrier structure and being adapted to run said structure into and out of the machine space between the top and bottom electrodes, two electrically conductive clamping chucks for receiving the respective two workpiece parts to be welded together, each of said chucks having electrically conductive clamping cheeks adapted to the shape of the workpiece and outer surfaces adapted to the shape of the electrodes, said carrier being adapted to hold said clamping cheeks, said two chucks being disposed on said carrier structure and displaceable relative to the other for aligning the two clamped parts in proper mutual welding position on said structure outside of the welding machine, whereby said device affords running the pre-aligned workpiece and chuck assembly into the machine and setting said assembly onto the bottom electrodes prior to welding.

3. In a butt welding device according to claim 2, said mobile carrier being displaceable horizontally in a direction transverse to the direction of spacing between said top and bottom electrodes.

4. In a butt welding device according to claim 2, said mobile carrier being displaceable horizontally in a direction parallel to the upsetting axis of the workpiece and chuck assembly.

5. For use with a butt-welding machine having two pairs of top and bottom electrodes, a device for preparing to butt-weld heavy workpieces in short length in the upsetting direction on one or both sides of the weld, comprising a mobile carrier having a vertically displaceable carrier structure and being adapted to run said structure into and out of the machine space between top and bottom electrodes, two electrically-conductive clamping chucks for receiving the respective two workpiece parts to be welded together, each of said chucks having electrically-conductive clamping cheeks adapted to the shape of the workpiece, and outer surfaces adapted to the shape of the electrodes, said carrier being adapted to hold said clamping cheeks, said two chucks being disposed on said carrier structure displaceable relative to the other for aligning the two clamped parts in proper mutual welding position on said structure, whereby said device affords running the pre-aligned workpiece and chuck assembly into the machine and setting said assembly onto the bottom electrodes prior to welding.

6. The method of preparing for welding of heavy workpieces having short length in the upsetting direction to the weld, which comprises placing the two parts of the workpieces outside of the welding machine into respective intermediate clamping chucks of a shape adapted to that of the parts, aligning and clamping the parts of the chucks in the mutual positions required for welding, moving the chuck and workpiece assembly as a whole into the welding machine and removably contacting the chucks of the assembly with the electrodes of the machine.

References Cited in the file of this patent

UNITED STATES PATENTS

| | | |
|---|---|---|
| 375,022 | Thomson | Dec. 20, 1887 |
| 1,816,231 | Riemenschneider | July 28, 1931 |